Sept. 19, 1967 L. D. McEVOY 3,342,199
DIGITAL BLEND SYSTEM
Filed July 7, 1965 2 Sheets-Sheet 1

*INVENTOR.*
LEO D. MC EVOY
BY *David E. Hopper*
ATTORNEY

INVENTOR.
LEO D. MC EVOY
BY David E. Hoppe
ATTORNEY

United States Patent Office 3,342,199
Patented Sept. 19, 1967

3,342,199
DIGITAL BLEND SYSTEM
Leo D. McEvoy, North Easton, Mass., assignor to The Foxboro Company, Foxboro, Mass., a corporation of Massachusetts
Filed July 7, 1965, Ser. No. 470,154
2 Claims. (Cl. 137—88)

This invention relates to blending systems and more particularly to digitally controlled trim systems.

In blending systems wherein components are blended directly and continuously into a final product stream, it has been common practice to employ additional trim stream on one or more components. This trim stream control was based on an analyzer measurement of the blended product stream. This analyzer signal was used to adjust the set point of the trim stream analog controller in order to maintain a desired characteristic in the blended product.

The present invention provides a trim system that utilizes a component stream with an attendant digital blend control loop and using additional stock items accurately trims the component to meet a desired blend characteristic in the final product. This is accomplished by providing a system employing pulse techniques combined with digital control.

Accordingly, it is an object of this invention to provide an efficient trim system operable with a single digital blending control stream.

It is another object of this invention to provide a trim system operated on the basis of pulse counting.

It is another object of this invention to provide a trim system which will accurately determine percentage of a trim component in the product output.

It is another object of this invention to provide a trim system which is simple, efficient and convenient to operate, as well as accurate.

Briefly stated, these objects are accomplished in the system wherein the product ouput is analyzed for the desired component concentration. The analyzer output is employed to trim a component flow plus or minus a small percentage, as determined by settings of a digital scaler. Switching between the two scaler outputs determines by a digital reference technique, the requisite trim control output.

These and other features of the invention will become apparent from the following detailed description thereof, taken in conjunction with the several figures of the drawings, in which.

Figure 1:
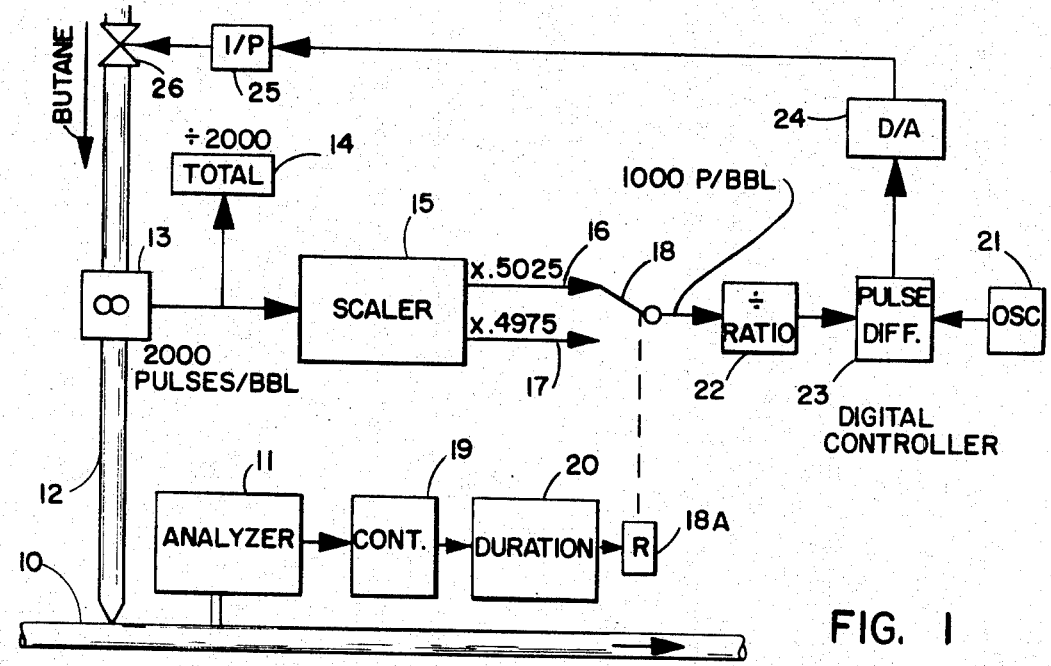
FIGURE 1 is a block diagram of a trim system wherein ratioing is on the measurement side.

Referring now to FIGURE 1, output stream 10 is monitored by analyzer 11. It is desired to maintain a certain vapor pressure in output stream 10, and this is accomplished by adjusting the butane flow in stream 12 according to the vapor pressure monitored by analyzer 11. Turbine meter 13 in stream 12 measures the butane flow and has an output of 2,000 pulses per barrel flow. This output is sent to a totalizer 14 which divides by a factor of 2,000 to indicate the total number of butane barrels passing through trim stream 12. The turbine meter 13 output is also applied to countdown scaler 15 which has two outputs, one output 16 providing for a multiplying factor of .5025 of the input, and the other output, 17, providing for a multiplying factor of .4975 of the input. Outputs 16 and 17 are connected to contacts of a double-pole relay 18, one of which is selected at any time. Relay 18 selects either of the sealed outputs according to whether the vapor pressure is too high or low.

Vapor pressure analyzer 11 measurement output is controlled by a pneumatic or electronic controller having an output proportional to the desired vapor pressure. The controller is designated 19. The output of pneumatic or electronic controller 19 is converted to a time duration pulse by telemeter 20 or other. This pulse duration output from telemeter 20 is applied to the armature 18A of relay 18. Thereby, relay 18 is actuated into either of the two multiplying factors of the scaler according to whether vapor pressure is too high or low, requiring an appropriate adjustment in the butane flow to re-establish the requisite pressure.

Reference oscillator 21, in effect, establishes the set point by having an output significance of 1 pulse per barrel. The output of relay 18 is ratioed by unit 22 and applied to one input of digital controller 23. The other input of the digital controller 23 is supplied from oscillator 21. The pulse difference output of the digital controller 23 is applied to digital-to-analog converter 24, such output signifying any error between measurement and demand. Digital-to-analog converter 24 converts the pulse error to an electronic analog signal which is converted to pneumatic pressure by current-to-pneumatic converter 25 and thence supplied to valve 26, thereby controlling it.

Figure 2:
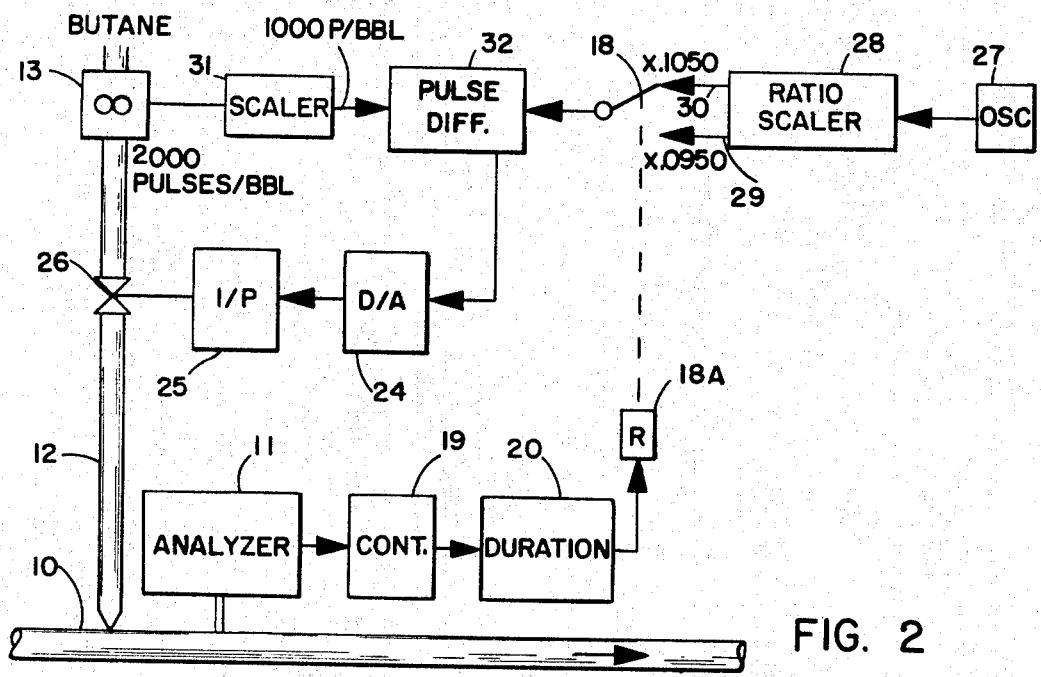
FIGURE 2 is a block diagram of a trim system wherein the ratioing is on the set point side.

Referring now to FIGURE 2, a block diagram of a trim system is shown in which the ratioing is performed on the set-point side of the system. As in the system of FIGURE 2, the product is continually sampled by vapor pressure analyzer 11 and the measurement output of the analyzer is controlled by a pneumatic or electronic controller 19. The output of controller 19 is converted to a pulse duration signal by converter 20 whose output operates armature 18A of relay 18. The pulse duration output of converter 20 and hence the relative time actuation of relay 18 is determined by the proportion of vapor pressure monitored by analyzer 11.

Oscillator 27 determines the butane concentration set point, and has an output of 1,000 pulses per barrel. The ratio unit determines the butane concentration in the final throughput of stream 10. Either output 29 or output 30 of the ratio unit is selected by double-pole relay 18 and thence transferred to pulse differencer 32. The other input of pulse differencer 32 comes from turbine meter 13 whose 2,000 pulses per barrel output is scaled by scaler 31. Since a normal butane ratio of 10% of the total is desired, the pulse inputs to pulse differencer 32 should be equal, yielding a zero error output to digital analog converter 24, the output of which is connected to a pneumatic valve control signal. Any error is used to control the valve and re-establish the desired butane content.

In both the systems of FIGURE 1 and FIGURE 2, the analyzer effectively time proportions two pulse outputs based on deviation from analyzer set point. The relative time proportioned between the two outputs determines the actual trim percentage.

Figure 3:
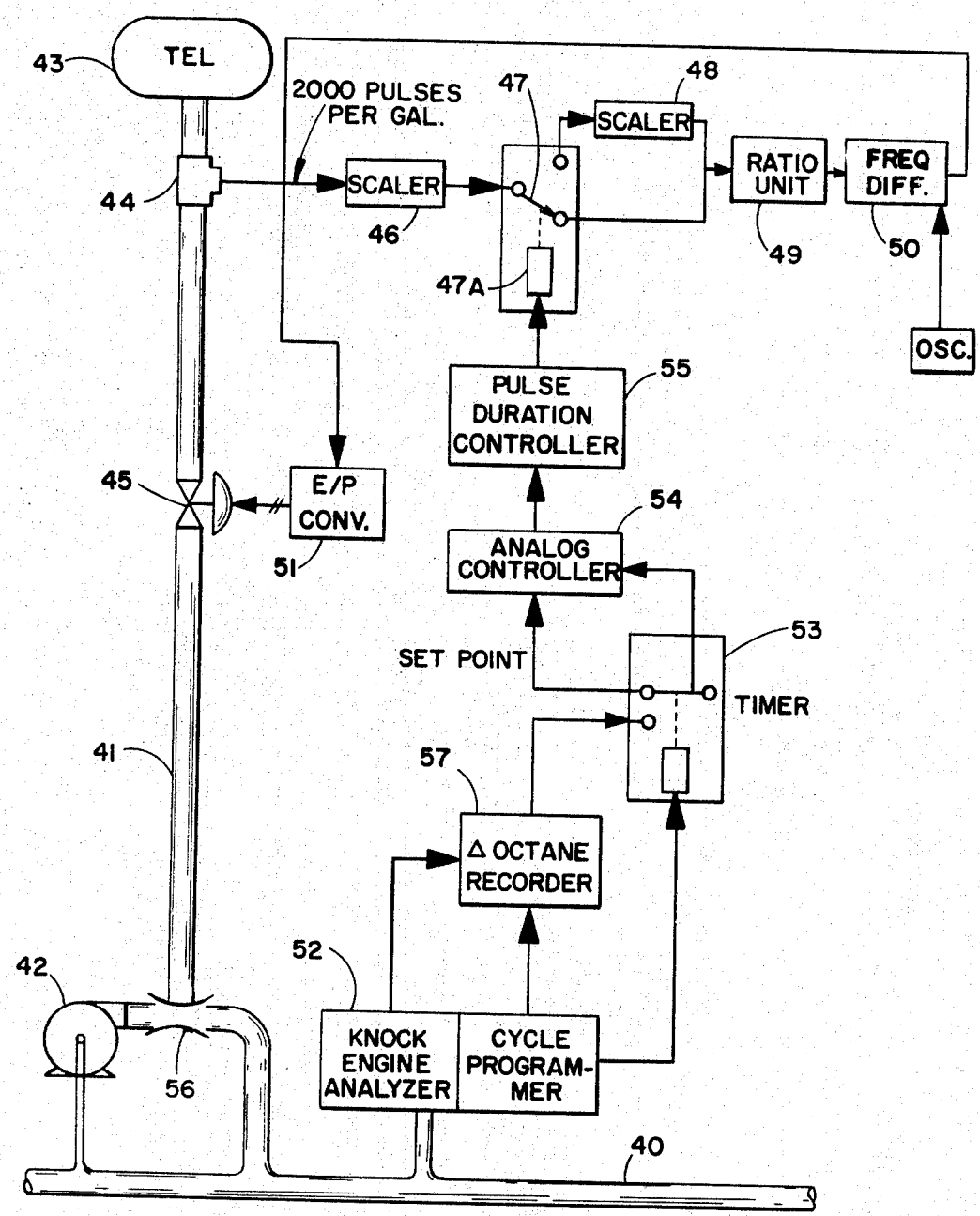
FIGURE 3 is a block diagram of a trim system for anti-knock component control.

Referring now to FIGURE 3, gasoline stream 40 is trimmed for a TEL content by stream 41. Eductor 56 pulls a vacuum when pump 42 forces a portion of gasoline stream 40 through it, the vacuum thereby promoting a flow from stream 41 into stream 40. The TEL supply 43 is monitored by turbine meter 44 and controlled by valve 45. The turbine meter output is 2,000 pulses per gallon which output is applied to scaler 46. Scaler 46 produces 1,100 pulses per gallon and its output is applied to the center contact of relay 47 having double poles, one of which is applied to the input of scaler 48, and the other of which by-passes scaler 48 to the input of pulse divider 49. Scaler 48 has a pulse output significant of 900 pulses per gallon when in series with scaler 46 by means of relay 47. The output of scaler 48 is also connected to the input of ratio unit 49.

If the TEL content is too high, the output of scaler 46, signifying 1,100 pulses per gallon is switched through relay 47 directly to the input of ratio unit 49. The output of scaler 46 yields 1,100 pulses per gallon, which is higher than the standard factor of 1,000 pulses. Since the pulse input to frequency differencer 50 is then too high, an error output of frequency differencer 50 is applied to valve 45, closing it and decreasing TEL flow.

If the TEL content of stream 40 is too low, relay 47 is proportionally actuated to be in position which switches scaler 48 in series with scaler 46. Thus, giving 900 pulses per gallon output of scaler 48 into the input of ratio unit 49. Since 900 pulses per gallon is too low, frequency differencer 50 output opens valve 45 increasing the TEL flow into stream 40.

In the system of FIGURE 3, analyzing takes an appreciable period of time by knock engine analyzer 52. Knock engine analyzer 52 alternately runs on a sample from stream 40 and a standard fuel contained therein. Each period of running lasts minutes and the difference in performance between the standard fuel and the output of stream 40 is compared by delta octane recorder 57, having an output representing any difference in the performance. Timer 53 periodically sets into controller 54 a portion of the delta octane output, which is integrated by analog controller 54 over a long period of time. Analog controller 54 uses a conventional reset function to approach the set point uniformly. The integrated sample error determines the long term set point of analog controller 54, whose output controls pulse duration controller 55, which, in turn, actuates armature 47A of relay 47.

While there has been shown what is considered to be a preferred embodiment of the invention, it will be manifest that many changes and modifications may be made therein without departing from the essential spirit of the invention. It is intended, therefore, in the claims to cover all such changes and modifications as fall within the true scope of the invention.

What is claimed is:

1. A digital trim system comprising:
an analyzer monitoring the concentration of a selected trim component of a main stream,
converting means responsive to the output of said analyzer for converting said output to a pulse duration signal signifying the trim component concentration determined by said analyzer,
a flow meter responsive to the flow of a trim stream supplying said main stream having an output consisting of a pulse train signifying the flow of said trim stream,
a scaler having an input responsive to said pulse train output of said flow meter and having two scaled output pulse trains each having a preselected proportional relationship to said pulse train output of said flow meter,
switching means responsive to said pulse duration signal from said converting means and actuated by said pulse duration signal and having two input terminals each respectively responsive to one of said two scaled output pulse trains from said scaler and said two input terminals being alternately selected by actuation determined by said pulse duration signal and having an output terminal whereby one of said two scaled output pulse trains is connected to said output terminal of said switching means,
a reference oscillator,
a pulse differencer having a first input responsive to the output of said oscillator and having a second input responsive to the selected said scaled output train at said output terminal of said switching means and having an output consisting of the pulse difference between said first and second inputs,
means for controlling a valve responsive to said output of said pulse differencer,
a valve regulating said trim stream responsive to said means for controlling a valve.

2. A digital trim system control comprising:
means for evaluating the concentration of a component of a fluid sample and having a first input adapted to sample periodically a main stream fluid and having a second input adapted to sample periodically a standardized fluid and periodically producing a deviation output signal indicating the deviation of said concentration of said main stream fluid from said concentration of said standardized fluid,
integrating means having an integrating input and having an integrated output,
a pulse duration controller having an input responsive to said integrated output of said integrating means and having an output consisting of pulses having a duration related to said integrated output,
first switching means having an input responsive to said deviation output signal and having an output periodically supplied to said integrating input of said integrating means, a flow meter responsive to the flow of a trim stream supplying said main stream having an output signal at a frequency signifying the flow of said trim stream,
a first scaler having an input responsive to said output signal of said flowmeter and having an output signal at a frequency that has a predetermined proportional relationship to the frequency of said signal at said input of said first scaler,
second switching means actuated by said output of said pulse duration controller and having an input responsive to said output signal of said first scaler, said input being alternately connected to first and second outputs of said second switching means by actuation of said output of said pulse duration controller,
a second scaler having an input responsive to said first output of said second switching means and having an output signal at a frequency that has a predetermined proportional relationship to the frequency of the signal at said input of said second scaler,
an oscillator having an output signal frequency for use as a system set point,
a frequency differencer having a first input responsive to said output signal frequency of said oscillator and having a second input responsive to said second output of said second switching means and said second input being also responsive to said output signal of said second scaler whereby the signal at said second input has a signal at a frequency determined by the actuation of said second switching means by said pulse duration controller, and
means for controlling a valve regulating said trim stream responsive to said output of said frequency differencer.

No references cited.

WILLIAM F. O'DEA, *Primary Examiner.*

D. J. ZOBKIW, *Assistant Examiner.*